United States Patent
Kondo et al.

(10) Patent No.: US 7,372,045 B2
(45) Date of Patent: May 13, 2008

(54) SCINTILLATOR PLATE FOR RADIATION

(75) Inventors: Masashi Kondo, Yokohama (JP); Takehiko Shoji, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/601,012

(22) Filed: Nov. 17, 2006

(65) Prior Publication Data
US 2007/0120061 A1    May 31, 2007

(30) Foreign Application Priority Data
Nov. 28, 2005 (JP) ............... 2005-341495
Nov. 28, 2005 (JP) ............... 2005-341500

(51) Int. Cl.
*G01J 1/58* (2006.01)
*G01T 1/20* (2006.01)
*G01T 1/00* (2006.01)

(52) U.S. Cl. ........... 250/483.1; 250/367; 250/486.1

(58) Field of Classification Search ......... 250/483.1, 250/484.4, 486.1, 367; 427/65
See application file for complete search history.

(56) References Cited

U.S. PATENT DOCUMENTS

| | | | | |
|---|---|---|---|---|
| 4,437,011 | A | * | 3/1984 | Noji et al. ............ 250/486.1 |
| 7,265,371 | B2 | * | 9/2007 | Shoji et al. ............ 250/581 |
| 2005/0040340 | A1 | * | 2/2005 | Morikawa et al. ...... 250/484.4 |
| 2005/0061993 | A1 | * | 3/2005 | Shibuya et al. ......... 250/484.4 |

FOREIGN PATENT DOCUMENTS

JP    63-215987    9/1988
JP    2003-66147    3/2003

OTHER PUBLICATIONS

"Amorphous Semiconductor Usher in Digital X-ray Imaging" by John Rawlands, Physics Today, Nov. 1997, p. 24.
"Development of a High Resolution, Active Matrix, Flat-Panel Imager with Enhanced Fill Factor" by L.I. Anthonuk, SPIE, 1997, vol. 32, p. 2.

* cited by examiner

Primary Examiner—Dave Porta
Assistant Examiner—Faye Boosalis
(74) *Attorney, Agent, or Firm*—Frishauf, Holtz, Goodman & Chick, P.C.

(57) ABSTRACT

An object is to provide a scintillator plate exhibiting even sharpness, and further exhibiting enhanced sharpness by use of CsI crystals. Disclosed is a scintillator plate for radiation comprising a support and provided thereon a phosphor layer emitting light caused upon exposure to radiation, wherein the phosphor layer comprises a plurality of phosphor columnar crystals, and any two phosphor columnar crystal diameters represented by a and b (a≧b) satisfy the following inequality of 1.0≦a/b<1.5. Further disclosed is a scintillator plate for radiation comprising a support and provided thereon a phosphor layer emitting light caused upon exposure to radiation, wherein the phosphor layer comprises a phosphor made from cesium iodide (CsI) as a base material and an activator, and a most dominant growth direction in the phosphor is (n 0 0) plane (where n=1, 2 or 3).

4 Claims, 2 Drawing Sheets

SCINTILLATOR PLATE FOR RADIATION

This application claims priority from Japanese Patent Application Nos. 2005-341495 and 2005-341500 filed on Nov. 28, 2005, which are incorporated hereinto by reference.

TECHNICAL FIELD

The present invention relates to a scintillator plate for radiation having a phosphor layer composed of columnar crystals and specifically to the scinticular plate for radiation in which sharpness is enhanced by employing CsI crystals.

BACKGROUND

Generally, radiographic images such as X-ray images have been commonlly utilized for diagnoses of condition of a patient at medical scenes. In particular, radiographic images by an intensifying screen-film system, as a result of achievement of a high sensitivity and a high image quality during the long improvement history, are still utilized at medial scenes all over the world as an image pick-up system provided with the both of high reliability and superior cost performance.

However, the image information is so-called analogue image information, and it is impossible to perform free image processing and image transmission in a moment as with digital image information which has been ever developing in recent years.

Therefore, in recent years, a radiographic image detector system such as computed radiography (CR) and flat-panel type radiation detector (FPD) has come to be in practical use. Since these can directly obtain a digital radiographic image and directly display the image on an image display device such as a cathode ray tube and a liquid crystal panel, there is not necessarily required image formation on photographic film. As a result, these digital X-ray image detector systems have decreased necessity of image formation by silver salt photography and significantly improved convenience of diagnostic works at hospitals and clinics.

CR has come to be in practical use in medical scenes at present as one of digital technologies of X-ray images. However, the sharpness is not sufficient nor the spatial resolution is, and CR has not achieved an image quality of a screen-film system. In addition, flat plate X-ray detector system (FPD) employing thin film transistor (TFT), described in such as "Amorphous Semiconductor Usher in Digital X-ray Imaging" by John Rawlands, Physics Today, 1997 Nov., p. 24, and "Development of a High Resolution, Active Matrix, Flat-Panel Imager with Enhanced Fill Factor" by L. I. Anthonuk, SPIE, 1997, vol. 32, p. 2, as a further new digital X-ray image technology has been developed.

It is a feature that such a FPD is smaller in size than a CR and is superior in image quality of image pick-up at a high dose. However, on the other hand a FPD produced a problem such that an SN ratio is decreased at image pick-up at a low dose, accompanied with a insufficient image quality, because of electric noise caused by providing a TFT as well as a circuit.

In such a FPD, utilized is a scintillator plate, which is prepared by employing an X-ray fluorescent material provided with a property of emitting via radiation to convert radiation into visible light, and it is necessary to utilize a scintillator plate having a high emission efficiency to improve an SN ratio in image pick-up at a low dose. Generally, the emission efficiency of a scintillator plate is determined by a thickness of a fluorescent layer and an X-ray absorption coefficient of a fluorescent material, however, the thicker the fluorescent layer thickness, the more sharpness is decreased due to scattering of emission light in a fluorescent layer.

Cesium iodide (CsI) here has a relatively high conversion ratio from X-ray to visible light and the fluorescent material is possible to be formed into a columnar crystal structure by vacuum evaporation. An optical guide effect, in which luminescence within the crystals that is emitted from the side surfaces of the columnar crystals is reduced, can be obtained by providing a phosphor composed of columnar crystals. That is, the scattering of luminescence as well as the sharpness drop is suppressed. It is accordingly possible that the thickness of a phosphor layer is made thicker without degrading sharpness. A CsI columnar crystal diameter is generally 3-20 μm, and the thinner the columnar crystal diameter is, the higher the optical guide effect is obtained, resulting in enhanced sharpness.

Incidentally, it is strongly desired to uniform an image quality distribution within a detector plane, since the detection area of FPD is large. In other words, it is desired to uniform the distribution within the plane concerning various phosphor properties in order to improve the image quality, since the distribution within the plane depends largely on an image distribution. Specifically, it is also desired to uniform the phosphor columnar crystal diameter within the detector plane since sharpness depends largely on a phosphor columnar crystal diameter.

Therefore, as described in Patent Document 1, known is a scintillator plate for radiation in which the phosphor columnar crystal diameter becomes larger from the center of a phosphor layer toward the periphery. According to such the scintillator plate for radiation, no damage is to occur during adhesion employing a roller and a sensor panel equipped with a photoelectric transducer section when phosphor is strengthened by making phosphor columnar crystals at the periphery thicker, whereby an image with no blur together with no damage of phosphor at the production stage can be obtained.

Also known is a scintillator plate which is fixed by covering a phosphor layer with films after preparing phosphor composed of columnar crystals by employing CsI, as described in Patent Document 2. Such the scintillator plate is capable not only of controlling degradation of sharpness, but also of protecting the phosphor to be covered with the films.

(Patent Document 1) Japanese Patent O.P.I. Publication No. 2003-66147

(Patent Document 2) Japanese Patent O.P.I. Publication No. 63-215987

SUMMARY

In the case of employing a conventional scintillator plate for radiation, there is a problem such that an in-plane distribution of sharpness can not be evenly controlled since neither in-plane distribution of the phosphor columnar crystal diameter nor optical guide effect obtained in a phosphor layer can be obtained.

The present invention is made on the basis of the above-described situation, and it is an object of the present invention to provide a scintillator plate for radiation exhibiting sharpness evenly, accompanied with evenly prepared-phosphor columnar crystals in size. Disclosed is a scintillator plate for radiation comprising a support and provided thereon a phosphor layer emitting light caused upon exposure to radiation, wherein the phosphor layer comprises a plurality of phosphor columnar crystals, and any two phosphor columnar crystal diameters are represented by a and b (a≧b), provided that the inequality of 1.0≦a/b<1.5 is satisfied.

As for a conventional scintillator plate, there is also a problem such that it is difficult to improve sharpness since no crystallographic plane of CsI crystals in conjunction with sharpness is specified. Thus, it is further another object of the present invention to provide a scintillator plate exhibiting sharpness by use of CsI crystals. Also disclosed is a scintillator plate for radiation comprising a support and provided thereon a phosphor layer emitting light caused upon exposure to radiation, wherein the phosphor layer comprises a phosphor made from cesium iodide (CsI) as a base material and an activator, and a most dominant growth direction in the phosphor is (n 0 0) plane (where n=1, 2 or 3).

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

Figure 1:
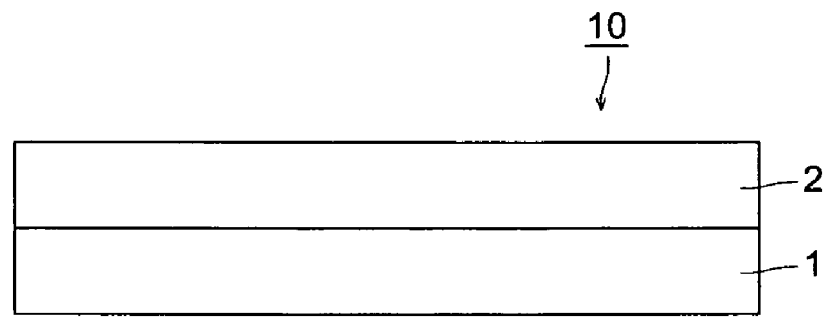
FIG. 1 shows a schematic cross-sectional view of a scintillator plate for radiation of the present invention.

The above object of the present invention is accomplished by the following structures.

(Structure 1) A scintillator plate for radiation comprising a support and provided thereon a phosphor layer emitting light caused upon exposure to radiation, wherein the phosphor layer comprises a plurality of phosphor columnar crystals, and any two phosphor columnar crystal diameters represented by a and b (a≧b) satisfy the following inequality (1):

$$1.0 \leq a/b < 1.5 \quad (1)$$

(Structure 2) The scintillator plate of Structure 1, wherein at least one of the phosphor columnar crystal diameters a and b is 3-10 μm.

(Structure 3) The scintillator plate of Structure 1, wherein the phosphor layer comprises a phosphor made from cesium iodide (CsI) as a base material and an activator, and a most dominant growth direction in the phosphor is (n 0 0) plane (where n=1, 2 or 3).

(Structure 4) The scintillator plate of Structure 3, wherein the activator contains at least one element of indium (In), thallium (Tl), lithium (Li), potassium (K), rubidium (Rb), sodium (Na) and europium (Eu).

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

Next, An embodiment of a scintillator plate for radiation in the present invention will be described referring to drawings, but the present invention is not limited thereto.

Scintillator plate 10 for radiation in the present invention possesses support 1, provided thereon phosphor layer 2, and when phosphor layer 2 is exposed to radiation, phosphor layer 2 absorbs incoming radiation energy, whereby produced is the electromagnetic wave (light) having a wave length of 300-800 nm (ultraviolet light to infrared light including visible light as the main light).

Figure 2:
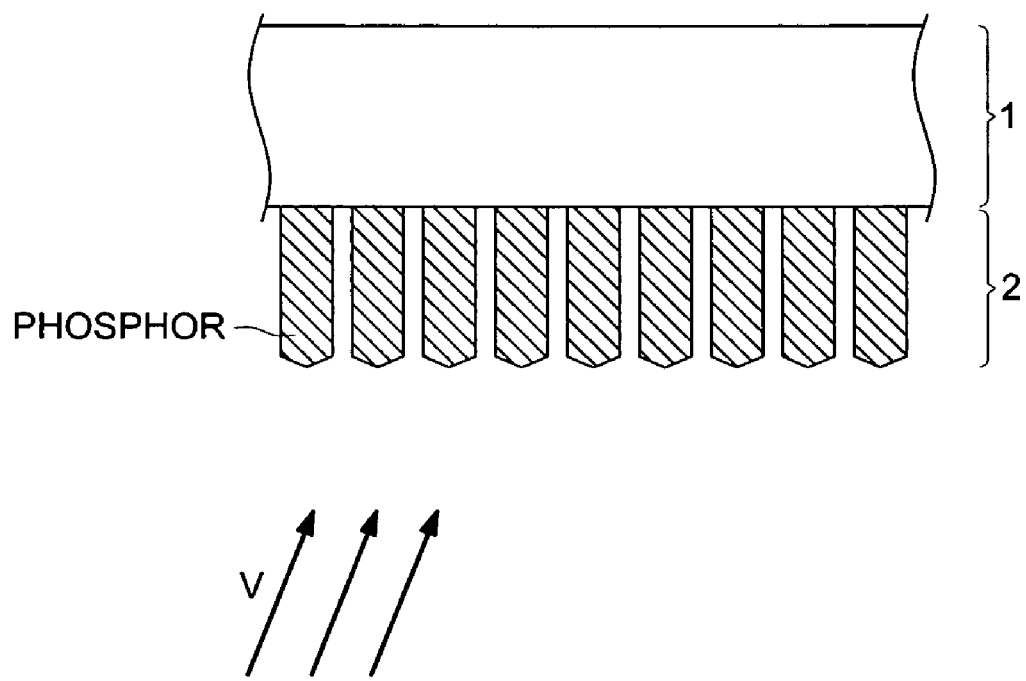
FIG. 2 shows a schematic illustration of a phosphor structure obtained via vacuum evaporation.

Support 1 is a substrate through which radiation such as X-ray is possible to be transmitted, and an aluminum plate or a resin sheet such as a carbon fiber reinforced resin sheet is preferably used in view of improved durability as well as reduction in weight, though a resin plate, a glass plate, a metal plate and the like are commonly employed Phosphor layer 2 is formed so as to provide a plurality of phosphors composed of columnar crystals in the direction roughly perpendicular to the upper surface of support 1. In addition, FIG. 2 explains the phosphor prepared by the after-mentioned vacuum evaporation process, and support 1 and phosphor layer 2 in FIG. 2 are upside down in comparison to those in FIG. 1. The phosphor is a Cs based compound, and examples thereof include CsI, CsBr, CsCl and so forth. Mixed crystals may also be formed by employing a plurality of raw materials constituting phosphor layer 2 as the foregoing Cs based compound with an arbitrary mixture ratio to use the mixed crystal based compound.

Further, the phosphor is formed by employing CsI as a base material, together with an activator. Preferably usable is as the activator at least one of indium (In), thallium (Tl), lithium (Li), potassium (K), rubidium (Rb), sodium (Na) and europium (Eu), but it is not limited thereto. These may also be used in combination. The addition amount of the activator is preferably 0.03-3 mol %, based on a base material.

An activator and the like may be added into phosphor layer 2 in order to increase an emission efficiency. Compounds of indium (In), thallium (Tl), lithium (Li), potassium (K), rubidium (Rb), sodium (Na), europium (Eu), copper (Cu), cerium (Ce), zinc (Zn), titanium (Ti), gadolinium (Gd) and terbium (Tb), for example, are usable as the activator, and these can be used in combination. In addition, when the phosphor contains CsI, it is preferable that 0.03-3 mol % of thallium iodide is used as an activator raw material.

Phosphor layer 2 is composed of phosphor columnar crystals, and any two phosphor columnar crystal diameters are represented by a and b (a≧b) under the condition of following inequality (1). 1.0≦a/b<1.5 ... (1), wherein the phosphor columnar crystal diameter means a column diameter, and it indicates the diameter in the case of a cylinder-shaped column and also indicates the longest diagonal in the case of a prismatic shaped column. The smaller the phosphor columnar crystal diameter is, the higher the optical guide effect accompanied with excellent sharpness is obtained. In the case, at least one of the phosphor columnar crystal diameters a and b is preferably 3-10 μm.

The most dominant growth direction in the phosphor constituting phosphor layer 2 is (n 0 0) plane (where n=1, 2 or 3). The most dominant growth direction here means the maximum intensity among the values of peak intensity of X-ray diffraction spectrum obtained via X-ray diffraction measurement of phosphor layer 2.

Next, a method of manufacturing phosphor layer 2 composed of columnar crystals will be explained according to the present embodiment. Phosphor layer 2 having a columnar crystal structure is formed on support 1 employing a commonly known vapor deposition method or vacuum evaporation method. In the case of utilizing CsI as a main component of a phosphor material, CsI and an activator as supply sources are evaporated onto support 1 (vacuum evaporation process). After the vacuum evaporation process is conducted, support 1 on which phosphor layer 2 is formed is subjected to heat treatment under the gas atmosphere (heating process).

Such the vacuum evaporation process is conducted employing evaporator 20. Evaporator 20 is equipped with vacuum vessel 22 in which a vacuum degree is adjustable. Vacuum vessel 22 is equipped with vacuum pump 21 with which the vacuum degree is adjusted by introducing inert gas into vacuum vessel 22 after evacuating air from the interior of vacuum vessel 22. Resistance heating crucible 23 as an evaporation source and support holder 25 supporting support 1 situated above resistance heating crucible 23 are also installed inside vacuum vessel 22. Support holder 25 is equipped with rotational mechanism 24 which is rotated on the upper side of resistance heating crucible 23 while adjusting temperature of support 1. A slit with which vapor flow coming from resistance heating crucible 23 is adjusted may also be placed between resistance heating crucible 23 and support holder 25.

An angle between phosphor formed by evaporator 20 and the surface of support 1 (hereinafter, referred to also as the support surface) is designed to depend on an incident angle of vapor flow V from resistance heating crucible 23 to the support surface. The above-described angle depends on phosphor material, and specifically in the case of using CsI as a base material, phosphor columnar crystals formed in the direction roughly perpendicular to the support surface (parallel roughly to the normal line) can be prepared when the incident angle of vapor flow V is in the range of 0-5° to the direction of the normal line of the support surface.

According to the present embodiment, temperature of support 1 is adjusted to a range of 150-300° C. in the vacuum evaporation process. Phosphor having an even columnar crystal diameter is to be also formed by combining a vacuum degree inside vacuum vessel 22 with a layer deposition rate indicating a phosphor growth speed. Phosphor is preferably prepared by adjusting to a vacuum degree of 5.0 E-3 Pa to 5.0 E-2 Pa and a layer deposition rate of 5-15 μm, depending on phosphor material and support 1.

According to the present embodiment, a layer deposition rate indicating a phosphor growth speed is also adjusted to a range of 5-15 μm in the vacuum evaporation process. Phosphor layer 2 in which the most dominant growth direction in the phosphor is (n 0 0) plane (where n=1, 2 or 3) is to be also formed by combining temperature of support 1 in the vacuum evaporation process with a vacuum degree inside vacuum vessel 22. Phosphor is preferably prepared by adjusting to a vacuum degree of 5.0 E-3 Pa to 5.0 E-2 Pa and a temperature of support 1 of 150 to 300° C., depending on phosphor material and support 1.

Next, the function of scintillator plate 10 for radiation will be described. When the incident radiation enters from phosphor layer 2 side toward support 1 side, phosphor particles in phosphor layer 2 absorb radiation energy generated by radiation entering phosphor 2, whereby the electromagnetic wave corresponding to the energy intensity is produced. In this case, phosphor having an even columnar crystal diameter is present on the surface of phosphor layer 2, and an even sharpness distribution can be obtained, since emission is caused at the same level of optical guide effect.

Therefore, the sharpness distribution of phosphor layer 2 becomes even since the columnar crystal diameter of phosphor constituting phosphor layer 2 in scintillator plate 10 is evenly arranged.

EXAMPLE

Example A

Preparation of Scintillator Plate for Radiation

Example A-1

Figure 3:
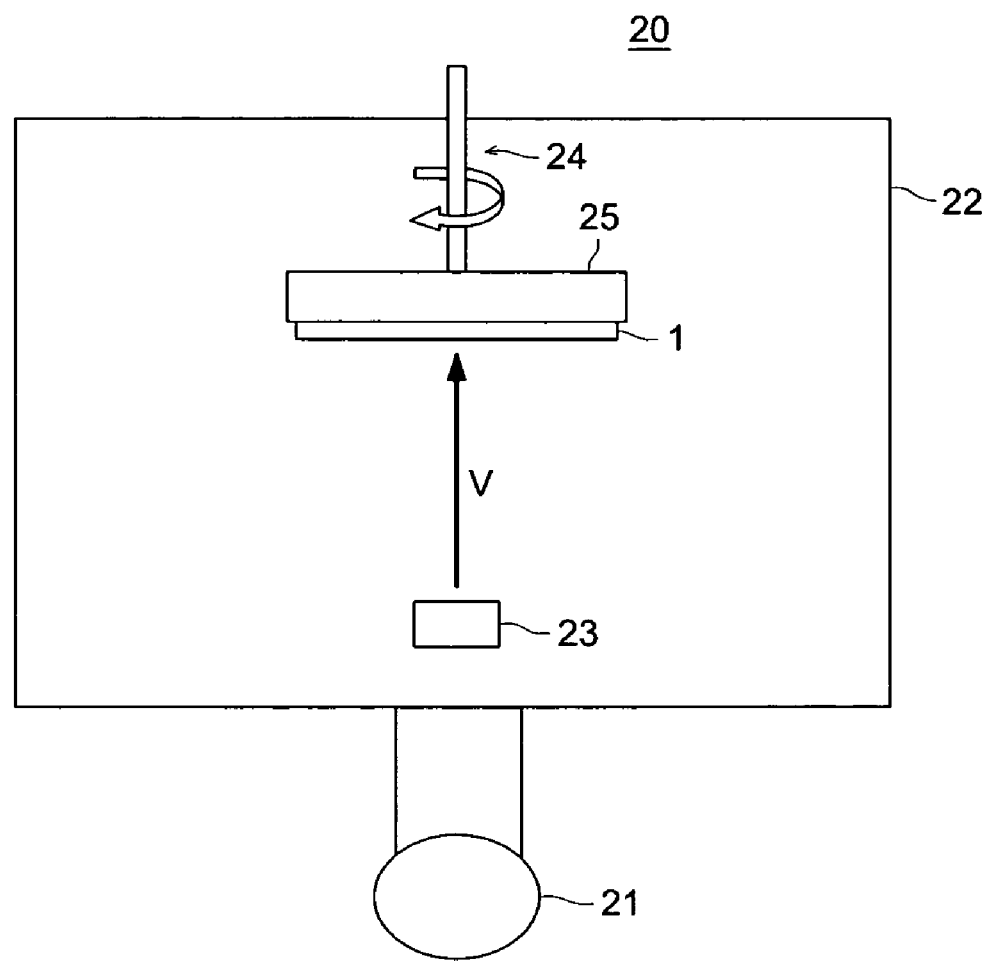
FIG. 3 shows a schematic diagram of an evaporator.

As an activator raw material, thallium iodide (TlI) is mixed in a ratio of 0.3 mol % with CsI, and the resulting was evenly pulverized and mixed in a mortar to prepare an evaporation raw material. The above-described evaporation raw material was evaporated onto one surface of support 1 composed of a carbon fiber reinforced resin sheet by using evaporator 20 as shown in FIG. 3 to form a phosphor layer. That is, the above-described phosphor raw material was placed in resistance heating crucible 23 as an evaporation material, and support 1 was set in support holder 25 rotated via rotational mechanism 24 to adjust the distance between resistance heating crucible 23 and support 1 to 400 mm. Successively, after the interior of evaporator 20 was once evacuated by using vacuum pump 21, an Ar gas was introduced into the interior of the evaporator to adjust a vacuum degree to 5.0 E-2 Pa, temperature of support 1 was maintained at 200° C. while rotating support 1 via rotational mechanism 24. Next, phosphor was formed by generating a phosphor vapor flow which was falling on support 1 via heating of resistance heating crucible 23, so as to be at a layer deposition rate around the support of 12 μm/min. When thickness of the phosphor layer reached 500 μm, the vacuum evaporation onto support 1 was terminated to obtain a scintillator plate of Example A-1 for radiation.

Example A-2

A scintillator plate of Example A-2 for radiation was prepared similarly to preparation of Example A-1, except that a vacuum degree in the vacuum evaporation process and a layer deposition rate around the support were replaced by 2.5 E-2 Pa and 6 μm/min, respectively.

Comparative Example A-1

A scintillator plate of Comparative example A-1 for radiation was prepared similarly to preparation of Example A-1, except that a vacuum degree in the vacuum evaporation process was replaced by 1.0 E-2 Pa.

Evaluation of Sharpness Distribution

Modulation transfer function (MTF) was determined to evaluate the sharpness distribution. Specifically, after a CTF chart was adhered to each of scintillator plates for radiation as sensor panels, each of the panels was exposed at 10 mR of 80 kVp X-rays (at a distance to the object: 1.5 m). Thereafter, samples were each exposed to a semiconductor laser light beam (a wave length of 690 nm and a power of 40 mW on the scintillator plate for radiation) from the surface side having phosphor layer 2, and scanned with the semiconductor laser light beam having a diameter of 100 μm to read the CTF chart, whereby the MTF value was measured. MTF values of α1 and α2 (α1>α2) are measured at 2 arbitrary areas in this way, and are substituted to following equation (2) to obtain sharpness distribution R.

$$R(\%) = [(\alpha 1 - \alpha 2)/(\alpha 1 + \alpha 2)] \times 2 \times 100 \quad (2)$$

The results are shown in Table A. Incidentally, the MTF value is a value when space frequency is 1 cycle/mm.

Measurement of Columnar Crystal Diameter

A surface image of phosphor layer 2 was observed employing a scanning electron microscope (SEM: S800, manufactured by Hitachi, Ltd.) in order to determine the phosphor columnar crystal diameter. An average columnar crystal diameter of phosphor crystals existing in an area of 50 μm×50 μm in the resulting image was determined, and average columnar crystal diameters obtained at 2 arbitrary areas (an area of 50 μm×50 μm) were designated as a and b (a>b), respectively. Average columnar crystal diameter ratio (a/b) was determined as an indicator of a columnar crystal diameter distribution. The results are shown in Table A.

TABLE A

| | Average columnar crystal diameter (μm) | | Average columnar crystal diameter ratio | Sharpness distribution |
|---|---|---|---|---|
| | a | b | (a/b) | R (%) |
| Comparative example A-1 | 18 | 12 | 1.5 | 15 |
| Example A-1 | 16 | 12 | 1.3 | 6 |
| Example A-2 | 6.0 | 5.0 | 1.2 | 3 |

As is clear from Table A, the results obtained in Examples of the present invention are superior to that of Comparative example.

Example B

As an activator raw material, rubidium iodide (RbI) is mixed in a ratio of 0.3 mol % with CsI, and the resulting was evenly pulverized and mixed in a mortar to prepare an evaporation raw material. The above-described evaporation raw material was evaporated onto one surface of support 1 composed of a carbon fiber reinforced resin sheet by using evaporator 20 as shown in FIG. 3 to form a phosphor layer. That is, the above-described phosphor raw material was placed in resistance heating crucible 23 as an evaporation material, and support 1 was set in support holder 25 rotated via rotational mechanism 24 to adjust the distance between resistance heating crucible 23 and support 1 to 400 mm. Successively, after the interior of evaporator 20 was once evacuated by using vacuum pump 21, an Ar gas was introduced into the interior of the evaporator to adjust a vacuum degree to 1.0 E-2 Pa, temperature of support 1 was maintained at 200° C. while rotating support 1 via rotational mechanism 24. Next, phosphor was formed by generating a phosphor vapor flow which was falling on support 1 via heating of resistance heating crucible 23, so as to be at a layer deposition rate around the support of 12 μm/min. When thickness of the phosphor layer reached 500 μm, the vacuum evaporation onto support 1 was terminated to obtain a scintillator plate of Example B-1 for radiation.

Example B-2

A scintillator plate of Example B-2 for radiation was prepared similarly to preparation of Example B-1, except that thallium iodide (TlI) was mixed in a ratio of 0.3 mol % as an activator raw material.

Comparative Example B-1

A scintillator plate of Comparative example B-1 for radiation was prepared similarly to preparation of Example B-1, except that temperature of support 1 was replaced by 150° C.

Measurement of Phosphor Growth Direction

As to the resulting scintillator plates for radiation, X-ray diffraction spectra were obtained employing an X-ray diffraction apparatus (manufactured by Rigaku Corporation). The maximum peak intensity in each of the X-ray diffraction spectra indicates the most dominant growth direction in a phosphor layer. The results are shown in table B.

Evaluation of Sharpness Distribution

Modulation transfer function (MTF) was determined to evaluate the sharpness distribution. Specifically, after a CTF chart was adhered to each of scintillator plates for radiation as sensor panels, each of the panels was exposed at 10 mR of 80 kVp X-rays (at a distance to the object: 1.5 m). Thereafter, samples were each exposed to a semiconductor laser light beam (a wave length of 690 nm and a power of 40 mW on the scintillator plate for radiation) from the surface side having phosphor layer 2, and scanned with the semiconductor laser light beam having a diameter of 100 μm to read the CTF chart, whereby the MTF value was measured as an indicator of sharpness. Incidentally, the MTF value is a value when space frequency is 1 cycle/mm. The sharpness measured in Comparative example B-1 was also set to 1.0 to determine the sharpness improving ratio of Example B-1 and Example B-2. The results are shown in Table B.

TABLE B

| | Dominant growth direction in phosphor layer | Activator element | Sharpness improving ratio |
|---|---|---|---|
| Comparative example B-1 | (220) | Rubidium (Rb) | 1.0 |
| Example B-1 | (200) | Rubidium (Rb) | 1.3 |
| Example B-2 | (200) | Thallium (Tl) | 1.4 |

As is clear from Table B, the results obtained in Examples of the present invention are superior to that of Comparative example.

EFFECT OF THE INVENTION

According to Structure 1 in the present invention, in-plane distribution of the phosphor columnar crystal diameter can be evenly adjusted since obtained is a scintillator plate for radiation comprising a support and provided thereon a phosphor layer emitting light caused upon exposure to radiation, wherein the phosphor layer comprises a plurality of phosphor columnar crystals, and any two phosphor columnar crystal diameters represented by a and b (a≧b) satisfy the following inequality of 1.0≦a/b<1.5. Thus, an optical guide effect obtained from each of phosphor columnar crystals is at the same level, whereby the in-plane distribution sharpness becomes even.

According to Structure 2 in the present invention, at least one of the phosphor columnar crystal diameters a and b in the scintillator plate for radiation is 3–10 μm, whereby phosphor exhibiting excellent sharpness caused by thin columnar crystal diameters can be obtained, and the scintillator plate for radiation having the even in-plane distribution, accompanied with excellent sharpness can be produced.

According to Structure 3 in the present invention, a scintillator plate exhibiting excellent sensitivity accompanied with largely enhanced sharpness is possible to be produced, since obtained is a scintillator plate for radiation comprising a support and provided thereon a phosphor layer emitting light caused upon exposure to radiation, wherein the phosphor layer comprises a phosphor made from cesium iodide (CsI) as a base material and an activator, and a most dominant growth direction in the phosphor is (n 0 0) plane (where n=1, 2 or 3).

According to Structure 4 in the present invention, the phosphor layer contains CsI as a base material, and luminance is possible to be enhanced by adding into the phosphor layer the activator containing at least one element of indium (In), thallium (Tl), lithium (Li), potassium (K), rubidium (Rb), sodium (Na) and europium (Eu).

What is claimed is:

1. A scintillator plate for radiation comprising a support and provided thereon a phosphor layer emitting light caused upon exposure to radiation, wherein the phosphor layer comprises a plurality of phosphor columnar crystals, and any two phosphor columnar crystal diameters represented by a and b ($a \geq b$) satisfy the following inequality (1):

$$1.0 \leq a/b < 1.5 \tag{1}.$$

2. The scintillator plate of claim 1,
wherein at least one of the phosphor columnar crystal diameters a and b is 3-10 μm.

3. The scintillator plate of claim 1,
wherein the phosphor layer comprises a phosphor made from cesium iodide (CsI) as a base material and an activator, and a most dominant growth direction in the phosphor is (n 0 0) plane (where n=1, 2 or 3).

4. The scintillator plate of claim 3,
wherein the activator containing at least one element of indium (In), thallium (Tl), lithium (Li), potassium (K), rubidium (Rb), sodium (Na) and europium (Eu).

* * * * *